US009142130B1

(12) United States Patent
Dukish

(10) Patent No.: US 9,142,130 B1
(45) Date of Patent: Sep. 22, 2015

(54) LIGHT EMITTING ROAD SAFETY DEVICE WITH SOUND ACTIVATION

(71) Applicant: Robert Allen Dukish, Canfield, OH (US)

(72) Inventor: Robert Allen Dukish, Canfield, OH (US)

( * ) Notice: Subject to any disclaimer, the term of this patent is extended or adjusted under 35 U.S.C. 154(b) by 259 days.

(21) Appl. No.: 13/903,301

(22) Filed: May 28, 2013

Related U.S. Application Data

(60) Provisional application No. 61/690,481, filed on Jun. 28, 2012.

(51) Int. Cl.
*B60Q 1/00* (2006.01)
*G08G 1/16* (2006.01)

(52) U.S. Cl.
CPC .................................... *G08G 1/164* (2013.01)

(58) Field of Classification Search
CPC ................................................... G08G 1/164
USPC ........... 340/908.1, 905, 933, 943, 425.5, 904, 340/539.13; 116/63 P
See application file for complete search history.

(56) References Cited

U.S. PATENT DOCUMENTS 3,938,080 A * 2/1976 Hulme ....................... 340/908.1
4,208,090 A 6/1980 Heenan
4,955,982 A 9/1990 Paulos
5,243,340 A * 9/1993 Norman et al. ............... 340/953
5,438,495 A 8/1995 Åhlen et al.
5,839,816 A 11/1998 Varga et al.
5,984,570 A 11/1999 Parashar
6,092,909 A 7/2000 Sools et al.
6,354,714 B1 3/2002 Rhodes
6,512,451 B1 * 1/2003 Eslambolchi et al. ..... 340/425.5
6,726,398 B2 4/2004 Hamakawa et al.
7,109,850 B2 9/2006 Kawazoe et al.
7,230,546 B1 * 6/2007 Nelson et al. ................ 340/933
7,688,222 B2 3/2010 Peddie et al.
2003/0053307 A1 3/2003 Talamo et al.
2005/0030739 A1 2/2005 Wang
2008/0243337 A1 * 10/2008 Tsuda ............................ 701/41
2008/0286043 A1 11/2008 Seo
2013/0113618 A1 5/2013 Flanagan et al.
2013/0300132 A1 * 11/2013 Almalki ........................ 290/4 R
2014/0190395 A1 * 7/2014 Cowan ......................... 116/63 P

* cited by examiner

*Primary Examiner* — Brent Swarthout
(74) *Attorney, Agent, or Firm* — Roth Blair Roberts Strasfeld & Lodge

(57) ABSTRACT

An embodiment of the present invention includes a light emitting road boundary marking for activation upon road departure. The marker includes a photovoltaic cell unit mounted in a housing and having a photovoltaic cell plate and a battery. Further, a light emitting unit is mounted with the housing, and the light emitting unit has a light to be turned on and off based on electricity supplied from the photovoltaic cell unit and conditions of a control unit. The control unit includes a microphone to detect a soundwave generated by a wheel traveling over a rumble strip, a comparing circuit to substantially match the detected soundwave with a pre-programmed soundwave pattern, and a driver unit to activate the light emitting unit when the detected soundwave substantially matches the pre-programmed soundwave. Other embodiments may include a microprocessor, a transmitter and a receiver unit for relaying an activation signal to adjacent markers, a lamp flashing circuit, and switching circuits for roadway illumination lamps.

12 Claims, 7 Drawing Sheets

LIGHT EMITTING ROAD SAFETY DEVICE WITH SOUND ACTIVATION

This patent application claims priority under 35 U.S.C. §119 to U.S. Provisional Patent Application Ser. No. 61/690,481 filed on Jun. 28, 2012, which is incorporated by reference in its entirety.

TECHNICAL FIELD

The present invention relates to a roadside, luminous marking device activated by sound, such as the sound of a vehicle tire traveling over a rumble strip, for the purpose of alerting a driver and guiding the driver's line of vision.

BACKGROUND OF THE INVENTION

In order to decrease vehicular accidents caused by drivers inadvertently drifting out of the proper lane, the use of rumble strips has become commonplace. It is especially true along vast stretches of open freeway that rumble strips help to warn drivers if they mistakenly leave their lane and enter the shoulder of the roadway. The accidental drifting off of the roadway may be caused by a variety of factors, including poor weather conditions, distracted driving, and fatigue. When vehicle tires encounter the rumble strip, both a vibration and sound stimulus alert the driver to the error, but without a good frame of reference during night driving, an accident may still occur.

The sound of a vehicle's tire traveling over a rumble strip produces a distinct complex audio waveform. With this invention, the waveform has been electronically analyzed and the corresponding ratios of voltage levels, with respect to time, have been identified that are specific within the soundwave cycle of that of a vehicle tire traveling over a rumble strip. This information is used as a reference for which a comparing circuit is responsive and leads to activation of a roadside marking device. In the prior art, a microphone was adapted to respond to the general frequency range of the sound, but this brought about inaccuracies (i.e., falsely identifying the sound of engines or other typical traffic noise falling into that audio range). This invention overcomes the limitations in previous rumble strip audio responsive systems by using sound recognition technology to identify specific sound characteristics which then can trigger a roadside warning indicator. For even higher reliability, the comparing circuit also looks for repetitive triggering waveforms before activating a warning. Additionally, this device not only warns the errant driver of the vehicle drifting out of lane, but the roadside marker warning is visible to other drivers along the roadway and alerts them of the hazardous situation. With the embodiments of this invention containing a receiver/transmitter, networking amongst numerous roadside markers is also possible which can enhance the visibility of the warning indication by propagating it to adjacent markers placed along the roadway. The networking capability of this invention to relay information has additional safety benefits as well. By adjusting the comparing circuit's responsiveness, embodiments of this invention can visually alert drivers to other unsafe conditions, such as the presence of construction work zones, and assist in general navigation by providing roadway marking and illumination.

BACKGROUND ART

Automobile manufacturers are now offering many new models that contain situational awareness devices such as forward and reverse collision avoidance and onboard navigation systems that employ microphones, cameras, and a variety of sensors. An example of an onboard accident avoidance device is shown in U.S. Pat. No. 7,109,850, where a system of sensors are adapted to detect a rumble strip and trigger an alarm system to notify the driver of the vehicle to a roadway deviation through sound or other means. Also, a nighttime roadway illumination device is described in U.S. Publication No. 2008/0286043 for a solar-powered aid for improved navigation by increasing visibility along the roadway. Lane and position marker devices that passively reflect headlamps have also been employed along roadways for many years, and devices, such as described in U.S. Pat. No. 6,726,398, actively emit light to delineate driving lanes. As described, these devices may be self-contained and may also be solar-powered.

The present invention solves the problem of providing a unique situational awareness roadside warning only when an unsafe condition occurs in nighttime, or other visually challenging condition, by using sound, such as that of vehicle tires contacting rumble strips, to activate warning lights placed along the roadway to display an outermost boundary line. The present invention overcomes the need to retrofit older model vehicles with onboard warning devices, since the invention is not contained in the vehicle. Further yet, while current nighttime illumination, lane demarcation, and warning devices may help to lower the incidence of accidents, the advantage of activation only when a vehicle's tire is in contact with a specific section of the roadway is that it is a very controlled source of illumination that provides both a warning to the driver along with the visual position in reference to the boundary. Embodiments of the invention can cause the activation of a series of markers placed in a network along the roadway, while still other embodiments allow for visually warning motorists of other unsafe conditions and generally aiding in nighttime navigation.

SUMMARY OF THE INVENTION

An embodiment of the present invention includes a light emitting road boundary marking for activation upon road departure. The marker includes a photovoltaic cell unit mounted in a housing. The photovoltaic unit has a photovoltaic cell plate and a battery. Further, a light emitting unit is mounted with the housing, and the light emitting unit has a light to be turned on and off based on electricity supplied from the photovoltaic cell unit and conditions of a control unit. The control unit preferably includes a microphone to detect a soundwave generated by a wheel traveling over a rumble strip, a filter to condition the incoming audio signal, an analog tone detector to substantially match the incoming soundwave with the characteristics of a pre-programmed, soundwave pattern, a timing delay unit to hold information from one, or more, time periods of the detected soundwave, a coincidence detector to check for the proper waveform pattern and the correct repetitive time period, and a lamp driver unit to activate the light emitting unit when the detected sound substantially matches the sound of tires traveling over a rumble strip.

Other embodiments may include: 1) a microprocessor to compare a wider number of specific characteristics of an incoming audio waveform to that of a pre-programmed sound waveform produced by tires traveling over rumble strips (thereby increasing the reliability of system activation over that of the embodiment which solely relies on analog circuitry); and 2) a transmitter and receiver for relaying an activation signal for networking adjacent markers (i.e., the relay transmitter preferably includes limited radio signal strength and a transmitter/receiver modulation coding scheme to sequentially address and activate a preset number of markers along the roadway, both in front of, and behind the location where the straying vehicle triggers the first warning marker); and 3) sound recognition references to other than the sound waveform produced by tires running over a typical rumble strip, which allows for greater versatility of the invention (i.e., the ability to warn of hazardous conditions such as construction work zones and dangerous areas of roadway, and also to assist in general roadway navigation).

BRIEF DESCRIPTION OF THE DRAWINGS

Further features and advantages of the invention will be more apparent from the detailed description of a preferred, non-exclusive embodiment of a system according to the invention, which is described as a non-limiting example with the help of the drawings in which.

DETAILED DESCRIPTION OF PREFERRED EMBODIMENTS

Figure 1:
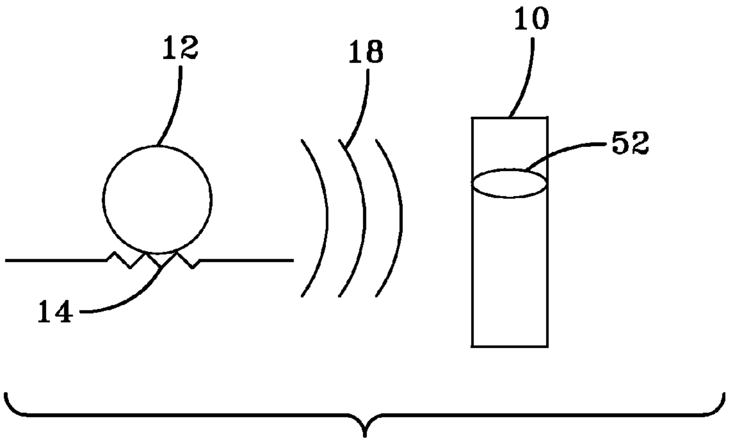
FIG. 1 is an illustration of sound waves produced by vehicle tires traveling over a rumble strip being received by a marker.

Referring to FIGS. 1-3B, the system of the invention is designed for use as a light emitting, roadway boundary marker 10 activated by sound vibration 18 caused by a vehicle's tire 12 driving off the driving lane 11 (delineated by a road marking 13) over a rumble strip 14 toward the roadside shoulder 15. To this end, the preferred embodiment comprises an elongated, water-tight housing 16 for encasing at least one light emitting unit 30, containing a component such as an LED. The markers 10, 10', etc. are positioned in the driver's field of sight along the roadway to act as warning and boundary indicators when activated. The housing 16 of the system additionally contains a photovoltaic cell plate 32 connected to a power storage device 34, such as a battery or battery bank. The invention is also comprised of a control unit 50 for the warning light emitting unit 30.

Figure 4A:
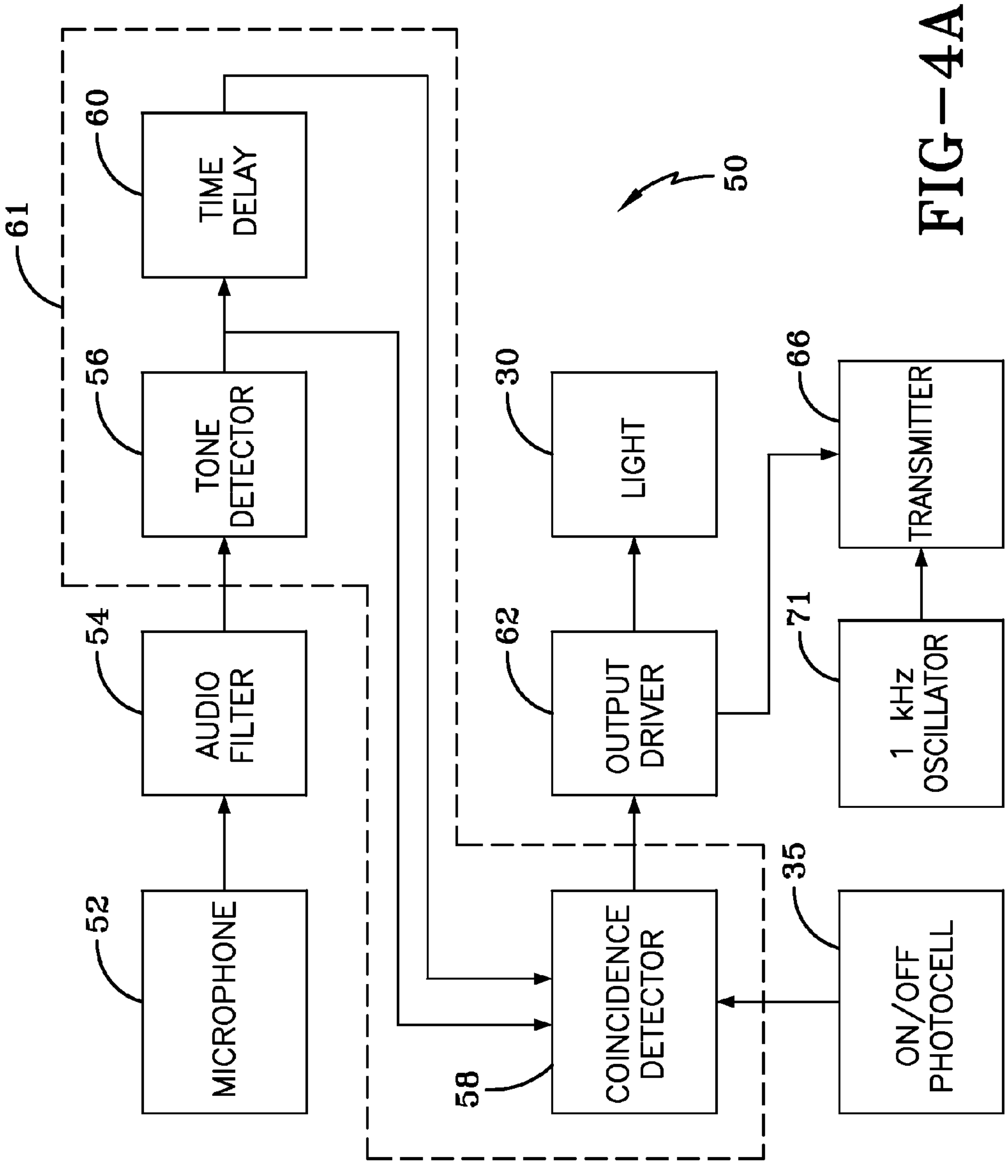
FIG. 4A is a block diagram of an analog embodiment of the control unit for stand-alone operation of each marker.
Figure 4B:
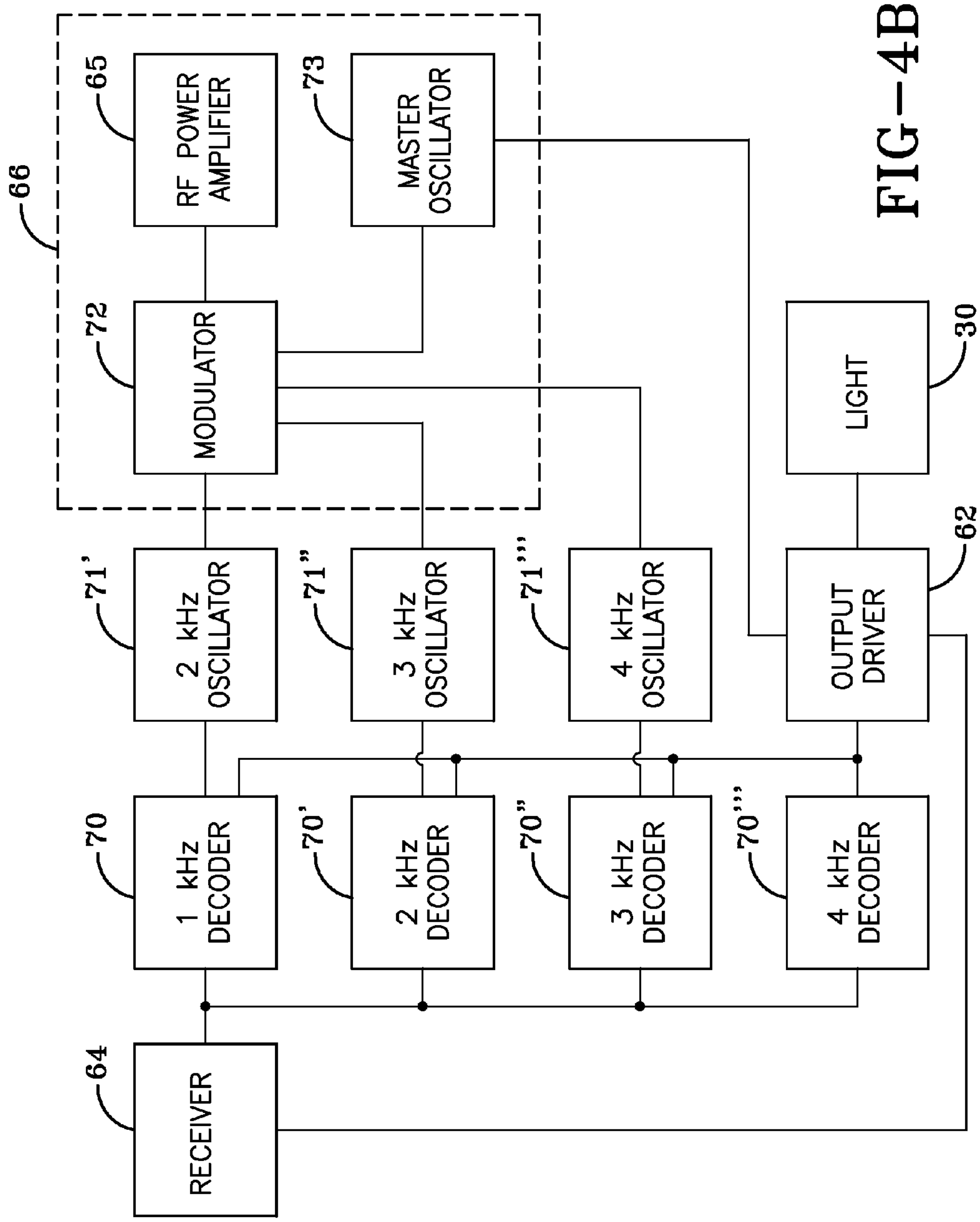
FIG. 4B shows a block diagram for analog decoding and encoding for wireless networked transmission.
Figure 5:
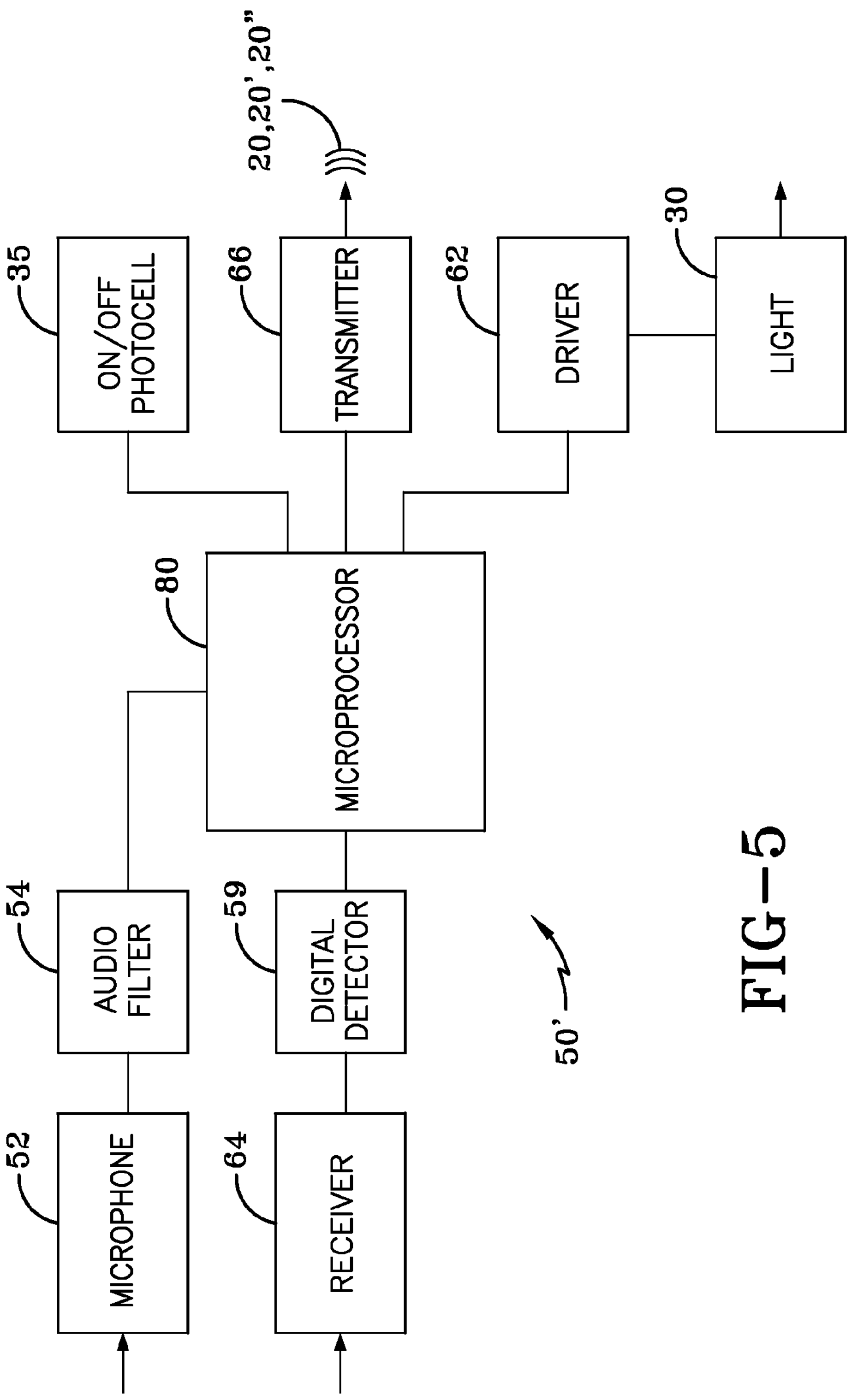
FIG. 5 is a block diagram of an alternative embodiment of the control unit with a microprocessor for audio waveform detection and networked operation of the markers.

Further yet, as best seen in FIGS. 4A, 4B, and 5, the control system contains a microphone 52 to detect the sound vibration 18 generated as a vehicle's tire 12 travels over the rumble strips 14. The microphone 52 may be any type of transducer able to respond to sound energy. Referring to FIG. 4A, the microphone 52 is part of a control unit 50 where the output of the microphone is preferably passed to a filter 54 for conditioning and amplification before being passed to a tone detector 56. The tone detector can be a simple analog circuit with resistive and capacitive components chosen to respond to voltage levels of the incoming audio wave of interest, which when working in conjunction with multivibrators will produce an output when the incoming audio wave 18 substantially matches the pre-programmed characteristics of the sound of a tire 12 traveling over the rumble strip 14. In the analog version illustrated in FIG. 4A, it is preferred that when the sound 18 is within the active range as determined by the circuitry of tone detector 56, and has the possibility to activate the light emitting unit 30, a time delay circuit 60 is used to store information from the sound waveform which will then be compared for repetition, with the incoming signal from the tone detector 56, by the coincidence detector 58. The tone detector 56, time delay 60, and coincidence detector 58 therefore work together as a comparing circuit 61 to prevent false triggering of the warning output driver 62. Once the detected sound 18 is considered reliable, a light flashing circuit of driver 62 activates the warning light emitter unit 30.

Figure 2:
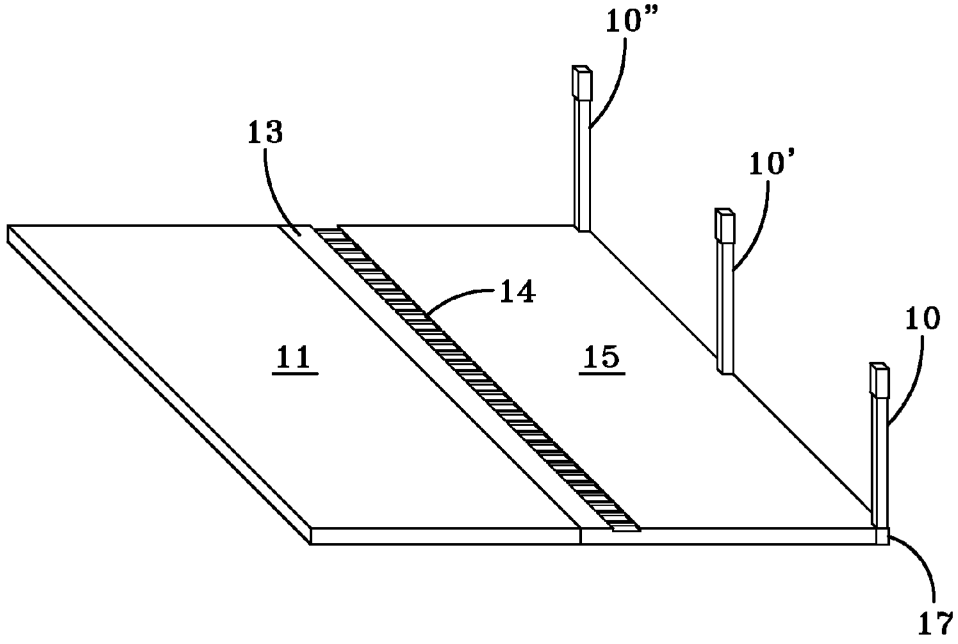
FIG. 2 shows the preferred placement of the markers along the roadway.
Figure 3A:
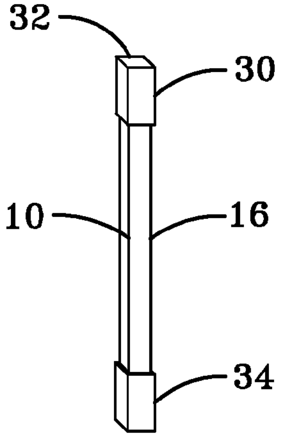
FIG. 3A is a perspective view of an assembled marker.
Figure 3B:
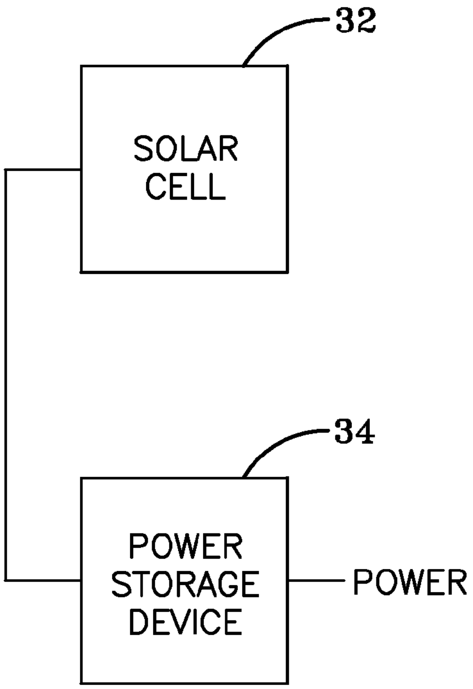
FIG. 3B is a simple block diagram of the power unit.

The photocell 35 is used to deactivate the control unit 50 during daylight hours to enable the power storage device 34 to develop a full charge. The invention may also include additional circuits for wirelessly relaying the warning condition 20, 20' to identical, adjacent markers 10', 10". Further yet, the invention can also be housed in many different structures such as in a guardrail, fence post, construction warning marker, and other general roadway markers and objects. The structures may be temporary or permanently installed. As shown in FIGS. 2 and 3A, it is preferred that each marker 10 be constructed in housing 16 having a material similar to common pavement-edge road reflectors that are often seen along the pavement-edge 17 of many roads and freeways, only having a length and cross-section large enough to accommodate the several system components.

Figure 7:
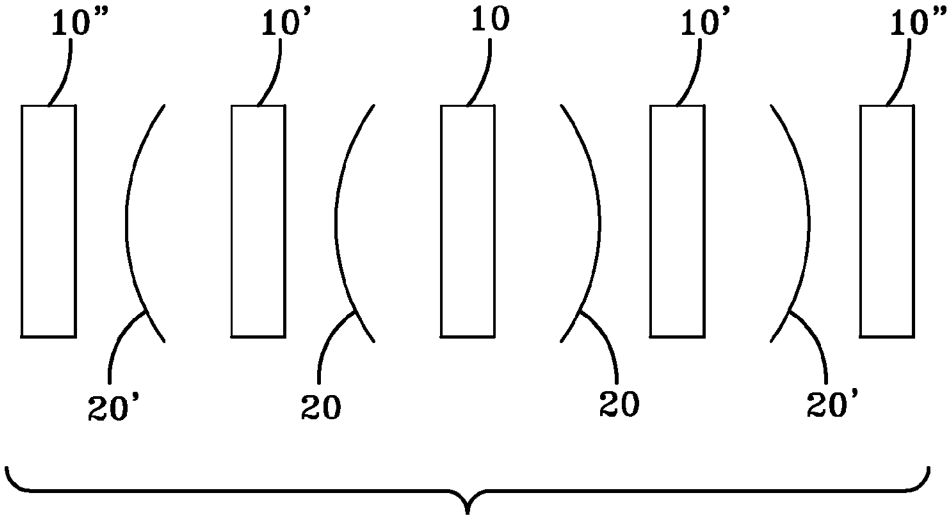
FIG. 7 illustrates the relayed transmission of signals from the initial activated marker to adjacent markers in a consecutive sequence.

Referring to FIG. 7, it is important to further explain how the invention can be operated as a consecutive linked system. As a linked system, the markers 10, 10', etc. are networked so that a visual warning indication is accompanied by transmitted signals 20, 20', etc. of either a radio frequency (RF), optical or other communication power emitting transmitter device 66 in order to trigger adjacent boundary markers, 10', 10", etc., to flash their warning light emitting units 30 after reception and decoding of the networked activation signal through receiver 64. Amplitude Modulation (AM) or Frequency Modulation (FM) can be used to implement the simple audio tone encoding/decoding scheme used for addressing markers along the network. In this embodiment, combining FIG. 4A with the additional control unit circuitry of FIG. 4B, a simple low cost system is depicted using the AM coding scheme, where the initial audio component of the activated warning transmission in FIG. 4A has an audio frequency of 1 kHz from the oscillator 71. In order to limit propagation, each subsequent relayed transmission through the network is encoded with a modulated signal that is simply a higher audio tone.

In this embodiment, the example illustrated in FIG. 4B shows 1 kHz audio decoder 70 in marker 10' activating output driver 62 which flashes light emitting unit 30 and enables master oscillator 73. Additionally, the 1 kHz decoder 70 would activate the 2 kHz oscillator 71'. With both the 2 kHz oscillator 71' and master oscillator 73 feeding the modulator 72, the transmitter 66 will output a modulated radio signal of 2 kHz audio through RF amplifier 65, which would then activate marker 10". Correspondingly, larger address numbers represented by higher frequency audio tones in 1 kHz steps, in our example, will be relayed along the network of FIG. 7. The receiving decoding units 70, 70', etc. and oscillator units 71', 71", etc. continually raise the address number through higher modulated tones to re-transmit the warning activation along the network. The system will eventually stop re-transmission when the received address tone goes too high and thereby out of range of the decoders 70, 70', etc. To prevent a coding error, the output driver 62 will disable receiver 64 as the marker is transmitting a signal.

For the coding scheme to activate only a preset number of markers and allow the network transmissions to sequentially flow along the row of markers, the markers must be placed at a specific distance from one another along the network. For ease of marker installation, FM can be used since the capture effect will tend to lock the receiver 64 on to the frequency phase of the most powerful transmitting device 66, which, therefore, would also be the closest, since all devices will be made to produce the same output power with only distance as a variable in the system (i.e., correlating with the inverse square law for power). Along with AM and FM, Frequency Shift Keying (FSK), phase shift keying (PSK), pulse position modulation (PPM), and many other modulation schemes could be employed as well, to code the signal 20, 20', etc. (i.e., to transmit and receive address information).

Still further, it is important to note that as shown in FIG. 5, microprocessor 80 could be used as a control unit 50' to replace much of the analog circuitry of FIGS. 4A and 4B. Moreover, the microprocessor 80 would be programmed as the comparing circuit 61 to compare the incoming soundwave with that of a pre-programmed waveform using a recognition algorithm that is digitally stored in the microprocessor memory (thereby increasing the reliability of system activation over that of the analog embodiment). The microprocessor 80 could also be used to provide the networking response through a sequence of pre-programmed instructions.

Figure 6:
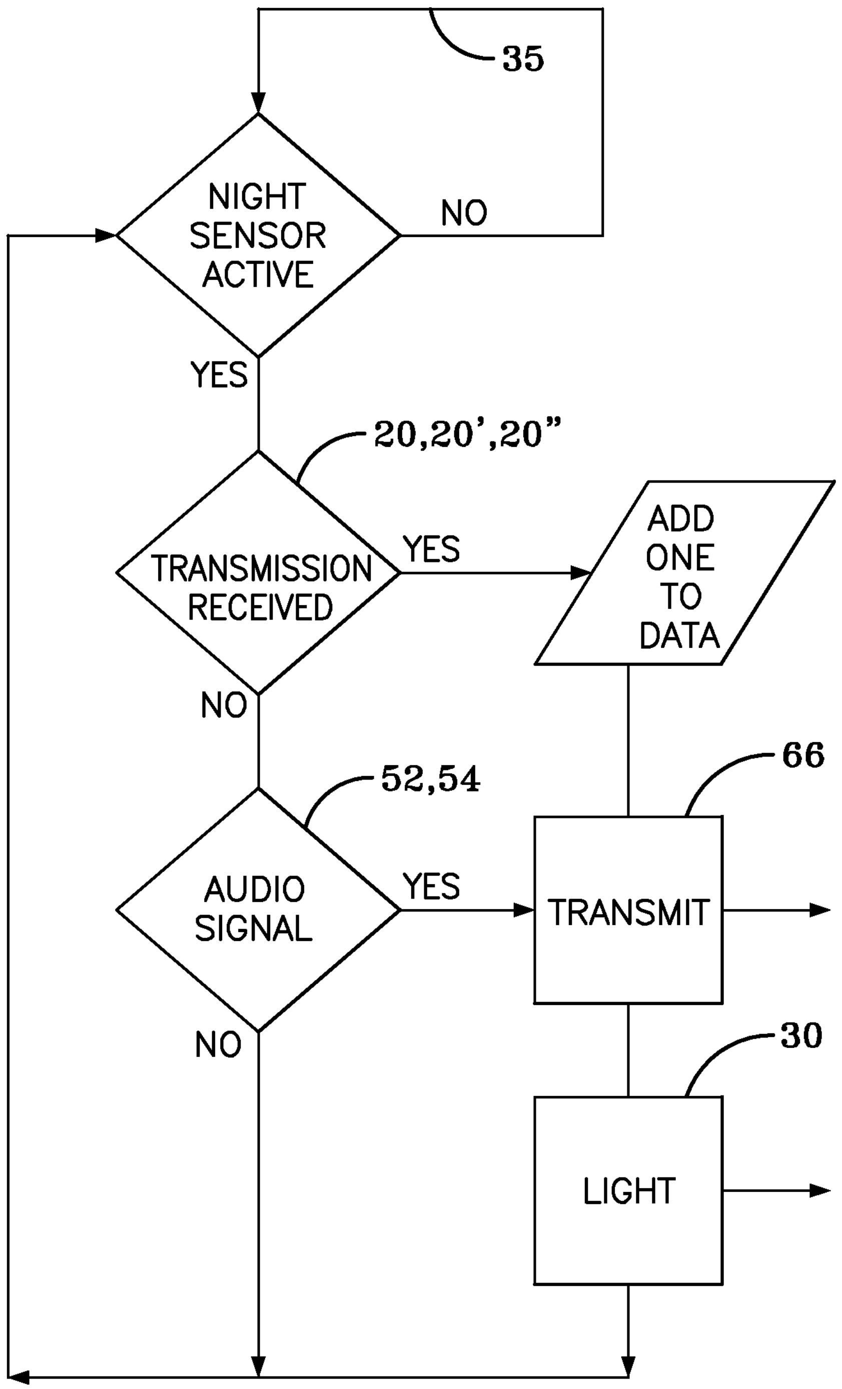
FIG. 6 is a logic diagram of the microprocessor operation for the networked system of FIG. 5.

Referring to FIG. 5 for microprocessor control and the flowchart of FIG. 6, in nighttime conditions on/off photocell 35 activates the device so that, when either microphone 52 picks up the sound of a tire traveling over the rumble strip 14 or receiver 64 picks up a network transmission, the microprocessor 80 is used to activate a transmitter 66 to send a signal 20 to adjacent markers 10'. The preprogrammed instructions in the adjacent markers 10' retransmit the activation signal 20' to activate the next set of markers 10" placed in series. The placement of the markers and power of transmissions, however, is preferably limited, as in the analog controlled system, in order to have the networked signals 20, 20', etc. sequentially follow and activate only a preset number of warning markers 10', 10", etc. in front and behind the location where the straying vehicle triggers the first warning marker 10 into operation. In other words, it is preferred that low power and a coding scheme be used in order for an orderly sequential relay of the transmission signals 20, 20', etc. between markers 10, 10', 10", etc., in the adjacent series of markers placed along the roadway. The transmission medium can utilize radio frequency energy, acoustic, optical, etc. Also, for reliability in this embodiment, the software program of the microprocessor 80 can be used to replace the tone detector 56, time delay 60, and coincidence detector 58 circuitry (described with reference to FIG. 4A) used to verify the detected sound 18 is actually the sound of vehicle tires 12 traveling over the rumble strip 14, and not an ambient noise such as the sound of a passing vehicle's engine or tire hitting a pothole.

Once a transmission begins, the microprocessor program would disable the receiver 64 and digital detector 59, so that the relay of the warning would be most reliable (i.e., the marker will not respond to its own transmission). The microprocessor activates driver 62 which flashes the warning indicator light emitting unit 30 for a predetermined amount of time. Using digital data coding techniques, the logic diagram of FIG. 6 shows how the output transmission is coded with a number. With a microphone activation causing the lowest number to be transmitted, and as each networked subsequent reception and re-transmission occurs, the microprocessor program of the corresponding marker 10', 10", etc. increments by one, a digital numbered signal 20', etc. transmitted to the next marker. In order to limit propagation, when the programmed "maximum" value of the digital numbered signal $\mathbf{20}^{max}$ is exceeded (for which the microprocessor 80 will respond), the re-transmission along the network ceases.

The markers 10, 10', 10" running in networked mode are activated as determined by a preset data number both in front of the vehicle to warn the driver of the unsafe condition and illuminate the boundary, and also the preset limit of devices will illuminate behind the vehicle to warn anyone following behind the errant vehicle of the pending roadway hazard. The warning signals need only be produced for a short period of time, possibly less than 10 seconds to fully warn all drivers, and then the system resets until another incident of contact with the rumble strip 14 occurs. The system will work under all but the harshest winter conditions when the rumble strip may become covered by snow and ineffective in producing adequate sound.

In other embodiments, the comparing circuit in the analog version, or the waveform recognition algorithm in the microprocessor based device, can be adjusted to allow the units to respond to sounds other than the sound of tires traveling over a normal rumble strip. This allows for customization of the invention to operate in a wide variety of applications. In one such embodiment, specific grooves may be milled in the roadway, or material added to the surface of the roadway, to produce a distinct sound waveform as vehicle tires travel across the modified pavement for which the control unit is adjusted to respond, thereby activating a marker which may be networked with a series of adjacent markers. By using the slightly different sound than that produced by a tire traveling over a standard rumble strip, this embodiment has applications in warning drivers of hazardous conditions such as construction work zones, or may be utilized to provide directional marking lighting to indicate turning lanes, or provide illuminated marking for other general roadway traffic navigational situations.

Still yet, the control unit may be adjusted or programmed to respond to the general sound of a vehicle traveling on standard pavement so that safety marker lamps or road illumination lamps may be activated to assist motorists driving on the roadway. This embodiment will save energy since the roadway markers and illumination lamps will remain off until such time that traffic dictates their usage.

It will thus be seen that a unique and novel roadside, luminous marking device activated by sound, such as the sound of a vehicle tire traveling over a rumble strip, for purpose of alerting a driver and guiding their line of vision, has been illustrated and described. It will be apparent to those skilled in the art that various changes and modifications may be made therein without departing from the spirit of the invention.

What is claimed is:

1. A light emitting road boundary marking device, comprising:

a housing;

a photovoltaic cell unit mounted in the housing and having a photovoltaic cell plate and a battery; and a light emitting unit having at least one light marker to be turned on and off based on power supplied from the photovoltaic cell unit and conditions of a control unit;

the control unit having a microphone to detect a soundwave at a particular location and an audio circuit to filter and condition the detected soundwave, a waveform comparing and control circuit to positively identify a distinct complex audio waveform indicative of a wheel traveling over a rumble strip by substantially matching the detected, filtered and conditioned waveform with a pre-programmed complex waveform indicative of a wheel traveling over a rumble strip, and a driver unit to activate the light emitting unit and at least one light associated with said particular location, when the detected, filtered and conditioned waveform substantially matches said pre-programmed complex waveform;

a transmitter for relaying an addressable activation signal to at least one adjacent light markers, and wherein a plurality of said light markers are networked and at least one adjacent networked marker includes an addressable receiver and a corresponding light emitting unit for illumination upon reception of the relayed activation signal that has been encoded with the correct address information; and a control and transmitter unit having the capability to adapt network address information to activate the next in a series of markers until such time that a predetermined maximum number of markers in the network activation protocol has been achieved.

2. The marking device of claim 1, wherein the driver unit includes a light flashing circuit.

3. The marking device of claim 1, wherein the microphone is a transducer.

4. The marking device of claim 2, wherein the light flashing circuit and waveform comparing circuit are configured in a microprocessor.

5. A light emitting road boundary marking device, comprising:

a housing;

a photovoltaic cell unit mounted in the housing and having a photovoltaic cell plate and a battery;

a transducer to detect a soundwave generated by a wheel traveling over a rumble strip at a particular location;

an audio circuit to condition the soundwave;

a light emitting unit having at least one light marker to be turned on and off based on power supplied from the photovoltaic cell unit and conditions of a microprocessor, the microprocessor having a sound recognition program to compare the detected conditioned soundwave with a pre-programmed complex waveform to activate the light emitting unit when the detected soundwave substantially matches a pre-programmed waveform characteristics of a tire traveling over a rumble strip at the particular location;

a transmitter for relaying an addressable activation signal to adjacent networked markers; and a control and transmitter unit having the capability to adapt network address information to activate a next one in a series of light markers until such time that a predetermined maximum number of light markers in a pre-programed network activation protocol has been achieved.

6. The marking device of claim 5, wherein the transducer is a microphone.

7. The marking device of claim 5, wherein at least one adjacent light marker is networked and includes an addressable receiver and a corresponding light emitting unit for illumination upon reception of the relayed activation signal that has been encoded with correct address information.

8. A portable roadway lighting and signaling device, comprising:

a control unit used to switch external power on and off for the purpose of illuminating at least one marker lamp, and wherein the control unit further comprises a transducer to detect a soundwave produced by a tire traveling over a particular section of roadway adapted to produce predetermined vibrations of the ambient air and produce a complex waveform from the transducer, an audio circuit to condition the complex waveform from the transducer, a comparing circuit to substantially match the conditioned detected complex waveform with a pre-programmed complex waveform, and a driver unit to activate external power switching to activate at least one marker lamp when the conditioned detected complex waveform substantially matches the pre-programmed complex waveform pattern for the particular section of roadway;

a transmitter for relaying an addressable activation signal to adjacent networked markers; and a control and transmitter unit having the capability to adapt network address information to activate a next one in a series of light markers until such time that a predetermined maximum number of light markers in a pre-programed network activation protocol has been achieved.

9. The roadway lighting and signaling device of claim 8 wherein the control unit is adjusted to detect the sound waveform of tires traveling over standard pavement that is not modified.

10. The roadway lighting and signaling device of claim 8 wherein the driver unit includes a light flashing circuit.

11. The roadway lighting and signaling device of claim 8 wherein the transducer is a microphone.

12. The roadway lighting and signaling device of claim 10 wherein the light flashing circuit and comparing circuit are configured in a microprocessor.

* * * * *